US010165071B2

(12) United States Patent
Zhang et al.

(10) Patent No.: US 10,165,071 B2
(45) Date of Patent: Dec. 25, 2018

(54) CLIENT-SIDE ACTIVITY MONITORING

(71) Applicant: Google LLC, Mountain View, CA (US)

(72) Inventors: Fan Zhang, Mountain View, CA (US); Joshy Joseph, Los Altos Hills, CA (US); Alexander James Rickabaugh, San Francisco, CA (US); Peng Zhuang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 60 days.

(21) Appl. No.: 14/997,370

(22) Filed: Jan. 15, 2016

(65) Prior Publication Data

US 2017/0208144 A1 Jul. 20, 2017

(51) Int. Cl.
*H04L 29/08* (2006.01)
*G06F 11/34* (2006.01)

(52) U.S. Cl.
CPC .......... *H04L 67/22* (2013.01); *G06F 11/3419* (2013.01); *G06F 11/3495* (2013.01); *H04L 67/02* (2013.01); *G06F 2201/865* (2013.01); *G06F 2201/875* (2013.01)

(58) Field of Classification Search
CPC ...................................................... H04L 67/22
USPC ........................................................ 709/224
See application file for complete search history.

(56) References Cited

U.S. PATENT DOCUMENTS

| 5,872,976 | A | 2/1999 | Yee et al. |
| 5,991,705 | A | 11/1999 | Klein et al. |
| 6,078,956 | A | 6/2000 | Bryant et al. |
| 6,526,371 | B1 | 2/2003 | Klein et al. |
| 6,633,908 | B1 | 10/2003 | Leymann et al. |
| 7,873,715 | B1 | 1/2011 | Haber |
| 8,266,281 | B1* | 9/2012 | Carlson ............... G06F 11/3419 709/203 |
| 2006/0085420 | A1 | 4/2006 | Hwang |
| 2008/0104224 | A1 | 5/2008 | Litofsky et al. |
| 2015/0324751 | A1* | 11/2015 | Orenstein ........... G06F 19/3481 702/3 |

OTHER PUBLICATIONS

"Concurrency model and Event Loop," Mozilla Developer Network, retrieved on Jan. 15, 2016. Retrieved from the Internet: URL<https://developer.mozilla.org/en-US/docs/Web/JavaScript/EventLoop>, 4 pages.

(Continued)

*Primary Examiner* — Vivek Srivastava
*Assistant Examiner* — Sibte Bukhari
(74) *Attorney, Agent, or Firm* — Fish & Richardson P.C.

(57) ABSTRACT

This document describes systems, methods, devices, and other techniques for monitoring the performance of activities executed at a computing device. In some implementations, a computing device receives a user input to invoke performance of an activity by the computing device. Multiple portions of computer code associated with the activity can be identified. For each portion of computer code, (i) the respective portion of computer code can be executed, and (ii) data can be recorded about the executing of the respective portion of computer code that indicates a time duration of the executing of the respective portion of computer code. A total time to completion of the activity can be provided based at least in part on aggregating the recorded data about the executing of the multiple portions of computer code.

18 Claims, 8 Drawing Sheets

(56) References Cited

OTHER PUBLICATIONS

Archibald, "Tasks, microtasks, queues and schedules," Aug. 17, 2015 [retrieved on Jan. 15, 2016]. Retrieved from the Internet: URL<https://jakearchibald.com/2015/tasks-microtasks-queues-and-schedules/>, 13 pages.
Swenson-Healey, "The JavaScript Event Loop: Explained," Carbon Five Blog, Oct. 27, 2013 [retrieved on Jan. 15, 2016]. Retrieved from the Internet: URL<http://blog.carbonfive.com/2013/10/27/the-javascript-event-loop-explained/>, 29 pages.
Written Opinion of the International Preliminary Examining Authority, dated Jan. 4, 2018, 6 pages.
International Search Report and Written Opinion in International Application No. PCT/US2016/065106, dated Mar. 13, 2017, 13 pages.
International Preliminary Report on Patentability issued in International Application No. PCT/US2016/065106, dated Apr. 4, 2018, 8 pages.

\* cited by examiner

CLIENT-SIDE ACTIVITY MONITORING

TECHNICAL FIELD

This document generally describes techniques for monitoring characteristics of computer-based activities at a client device, such as the latency in performing asynchronous activities, which can be used to optimize the performance of those activities, thereby reducing the amount of time required for the client device to perform the activities.

BACKGROUND

Computing devices enable users to perform a range of activities in response to receiving input that indicates a user's intent for an activity to be performed. A user may select an application icon from a desktop or menu interface, for example, to launch an application, or may select a hyperlink from within a webpage to navigate to another page. As computing devices become increasingly powerful, users expect the devices to react quickly with minimal response time. In a complex web application, for example, a user may instruct the application to generate a plot of a specified data set. In order to meet the user's expectation for minimal response times, a developer of the web application may seek to optimize client-side and server-side code required to perform the plotting activity in order to be as efficient as possible.

SUMMARY

This document generally describes systems, methods, devices and other techniques by which information concerning the performance of an activity at a client computing device can be determined, analyzed, and/or reported. In some implementations, a framework is implemented at a client device for tracking activity performance. The framework can track the status of an activity over time and can store information about the activity's execution, including information that indicates a time duration of the activity. In some implementations, the framework can be implemented by scripting code in a web page or web application and can record information about the execution of multiple tasks associated with the activity, such as information that indicates the respective execution times of each task. The framework can then be used to collect information that accurately indicates a latency associated with an activity from the perspective of a user of a computing device.

Some implementations of the subject matter described herein include a computer-implemented method. The method can include receiving, at a computing device, a user input to invoke performance of an activity by the computing device. Multiple portions of computer code associated with the activity can be identified, wherein each portion of computer code among the multiple portions of computer code can be scheduled to be executed asynchronously by the computing device at different times. For each portion of computer code among the multiple portions of computer code associated with the activity, (i) the respective portion of computer code can be executed, (ii) data can be recorded about the executing of the respective portion of computer code that indicates a time duration of the executing of the respective portion of computer code, and (iii) a determination can be made as to whether at least one subsequent portion of the computer code is also required to be executed to complete the activity. A total time to completion of the activity can be provided based at least in part on aggregating the recorded data about the executing of the multiple portions of computer code.

These and other implementations can optionally include one or more of the following features.

The total time to completion of the activity can be determined based at least in part on a sum of the time durations of the multiple portions of computer code.

Each portion of computer code among the multiple portions of computer code for the activity can include a respective original portion of computer code.

For each portion of computer code in at least a subset of the multiple portions of computer code for the activity, the portion of computer code can be modified to include (i) pre-work operations that are arranged to be executed before the respective original portion of computer code is executed, and (ii) post-work operations that are arranged to be executed after the respective original portion of computer code is executed. Executing the portion of computer code can include executing the modified portion of computer code, including executing (i) the pre-work operations for the portion of computer code, (ii) the respective original portion of computer code for the portion of computer code, and (ii) the post-work operations for the portion of computer code.

The respective pre-work operations for each modified portion of computer code, when executed, can cause the computing device to associate the respective modified portion of computer code with the activity and to start or resume a timer for the activity. The respective post-work operations for each modified portion of computer code, when executed, can cause the computing device to pause or stop the timer for the activity upon completion of execution of the corresponding original portion of computer code for the respective modified portion of computer code such that the time duration for executing the corresponding original portion of computer code is added to the timer.

The respective pre-work operations for each modified portion of computer code, when executed, can cause the computing device to associate the respective modified portion of computer code with the activity and to record a first timestamp that identifies a starting time for execution of the corresponding original portion of computer code for the respective modified portion of computer code. The respective post-work operations for each modified portion of computer code, when executed, can cause the computing device to record a second timestamp that identifies an ending time at which execution of the corresponding original portion of computer code for the respective modified portion of computer code completed.

The respective pre-work operations for each modified portion of computer code, when executed, can cause the computing device to mark in an activity log a status of the activity as active. The respective post-work operations for each modified portion of computer code, when executed, can cause the computing device to mark in the activity log the status of the activity as pending or ended.

The activity log can include a first entry that indicate the status of the activity and other entries that indicate statuses of other activities performed by the computing device.

The post-work operations for a first of the modified portions of computer code, when executed, can cause the computing device: (i) to determine whether at least one additional portion of computer code remains to be executed to complete performance of the activity; and (ii) in response to determining that at least one additional portion of computer code remains to be executed to complete performance of the activity, to change the status of the activity in the activity log from active to pending.

The post-work operations for a first of the modified portions of computer code, when executed, can cause the computing device: (i) to determine whether at least one additional portion of computer code remains to be executed to complete performance of the activity; and (ii) in response to determining that no additional portions of computer code remain to be executed to complete performance of the activity, to change the status of the activity in the activity log from active to ended.

Multiple portions of computer code for the activity can be scheduled to be asynchronously executed in a single thread such that the computing device executes only one of the multiple portions of computer code at a time.

A first portion of the computer code for the activity among the multiple portions of the computer code for the activity can be executed. At least a portion of computer code for a different activity can be executed, by the computing device and after executing the first portion of the computer code for the activity. A second portion of the computer code for the activity can be executed by the computing device after executing at least the portion of the computer code for the other activity. The total time to completion of the activity can include respective time durations of executing the first portion of the computer code for the activity and the second portion of the computer code for the activity, but a time duration of executing the at least the portion of the computer code for the different activity can be excluded from the total time to completion of the activity.

The multiple portions of computer code can include respective portions of scripting code, such as JAVASCRIPT® code.

A first portion of computer code among the multiple portions of computer code for the activity, when executed, can cause the computing device to transmit a remote procedure call to a server system remote from the computing device. The method can further include: (i) receiving, at the computing device and from the server system, a response to the remote procedure call, and (ii) recording, at the computing device, data that identifies a length of time that elapsed between transmitting the remote procedure call to the server system and receiving the response to the remote procedure call.

A total time to completion of the activity can be determined based at least in part on the length of time that elapsed between transmitting the remote procedure call to the server system and receiving the response to the remote procedure call.

Receiving the user input to invoke performance of the activity by the computing device can include identifying that the user input has selected a control associated with the activity in a user interface of a web page or application displayed on an electronic display of the computing device.

Some implementations of the subject matter described herein can include one or more non-transitory computer-readable media. The media can store instructions that, when executed cause performance of operations. The operations can include: receiving, at a computing device, a user input to invoke performance of an activity by the computing device; identifying multiple portions of computer code associated with the activity, wherein each portion of computer code among the multiple portions of computer code is scheduled to be executed by the computing device at different times; for each portion of computer code among the multiple portions of computer code associated with the activity: executing the respective portion of computer code, recording data about the executing of the respective portion of computer code that indicates a time duration of the executing of the respective portion of computer code, and determining whether at least one subsequent portion of the computer code is also required to be executed to complete the activity; and outputting a total time to completion of the activity based at least in part on aggregating the recorded data about the executing of the multiple portions of computer code.

Some implementations of the subject matter described herein include a computing device. The computing device can include one or more processors, a web browsing application, and an activity tracker. The web browsing application can include a rendering engine, an input handler, and a scripting engine. The rendering engine can be enabled to generate a presentation of a web page for display to a user. The input handler can be enabled to detect a user interaction with the presentation of the web page, the user interaction indicating an intent to invoke performance of an activity by the computing device. The scripting engine can execute one or more scripts in web code for the web page. The activity tracker can include a re-coding engine, a timer, and an activities log. The re-coding engine can be enabled to modify portions of computer code for the activity before the portions are executed by the web browsing application, the modifying including inserting code for pre-work operations and code for post-work operations for at least some of the portions of computer code, wherein the re-coding engine provides the scripting engine with the modified portions of computer code to be executed rather than the corresponding unmodified portions of computer code. The timer can be enabled to track one or more execution durations of the activity. The activities log can be enabled to store information that describes the one or more execution durations of the activity.

These and other implementations can optionally include one or more of the following features. The code for the pre-work operations, when executed, can cause the computing device to change a status of the activity to an active status. The code for the post-work operations, when executed, can cause the computing device to change the status of the activity to a pending status or an ended status. The activities log can further store information that identifies the status of the activity.

The code for the pre-work operations, when executed, can cause the computing device to start or resume the timer for the activity. The code for the post-work operations, when executed, can cause the computing device to stop or pause the timer for the activity.

Some implementations of the subject matter described herein may realize, in certain instances, one or more of the following advantages. The total time duration of an activity that is at least partially performed at a client computing device can be determined that reflects the latency perceived by the user of the computing device. For example, by detecting the times at which execution of each task associated with an activity begins and ends, the latency experienced by the user can be accurately determined. In some implementations, the latency associated with asynchronous activities can be determined, even when tasks associated with the activity are intermittently started and paused one or more times before the activity is completed. Thus, even where the client computing time interleaves performance of other activities between the tasks associated with a particular activity that is being tracked, the durations of only the relevant tasks for the tracked activity can be isolated so that the latency specifically associated with the targeted activity can be determined. In some implementations, a framework for tracking the status of an activity over time can be provided that allows the computing device to accurately track the complete lifecycle of an activity. For example, rules can be defined that govern the status and identification of activities and their constituent tasks. The rules may be defined so as reduce the occurrence of false tracking events, such as missed tasks, erroneous association of a task with a given activity, and premature detection of the completion of an activity. The subject matter disclosed herein improves the basic functioning of a client device (e.g., a computer) by improving the ability of the client device to track and/or report on the amount of time that the client device takes to complete a given asynchronous activity (e.g., that includes multiple separately scheduled tasks) even when tasks of other asynchronous activities are performed in between the tasks of the given asynchronous activity.

DESCRIPTION OF DRAWINGS

Life references and symbols among the drawings indicate like elements.

DETAILED DESCRIPTION

Figure 1:
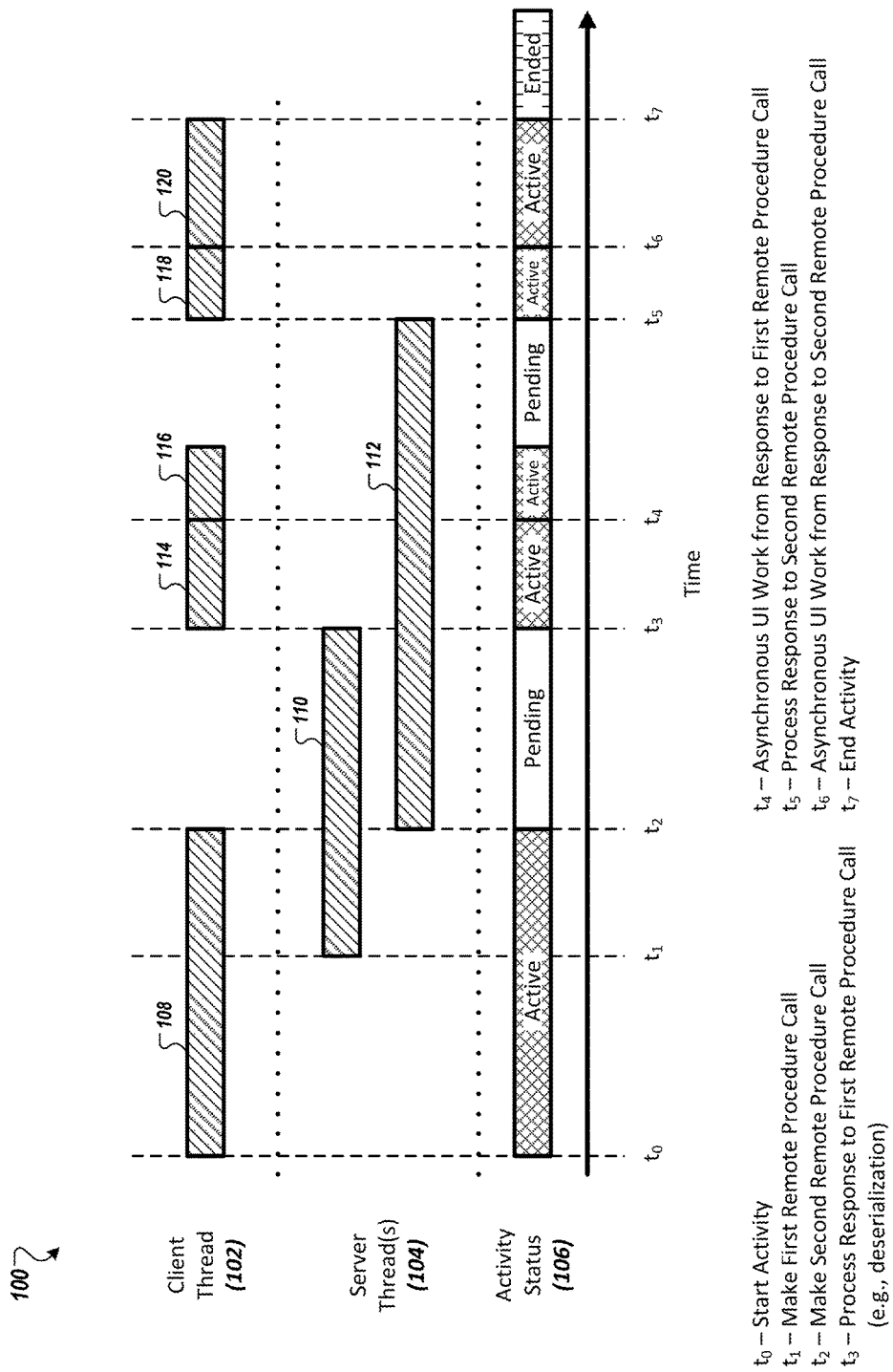
FIG. 1 depicts a conceptual timing diagram of an example activity performed in part on a client computing device and in part on a server.

This document generally describes systems, methods, devices, and other techniques for tracking activities executed on a computing device. The following disclosure enables tracking of multiple different asynchronous activities even where portions of the activities may occur during disjoint time periods. For example, prior to completion of a given activity, one or more tasks of a different activity may be performed. When the one or more tasks of the different activity have been completed, tasks of the given activity may continue to be performed. In this example, accurate tracking and/or reporting of the amount of time required to complete the given activity will take into account the fact that the operations of the different activity were performed in between performance of operations of the given activity.

An activity is generally any collection of operations performed by a computing device (whether alone or in coordination with one or more other computers) that are related to a triggering event that invoked the activity. For example, the triggering event may be a user interaction with the computing device that indicates the user's intent to refresh a stock ticker on a webpage. The collection of operations that are performed in response to the user interaction (i.e., the triggering event) may be referred to as an activity. In some cases, an activity may be comprised of a set of tasks that each relates to a portion of the overall work needed to carry out the activity. A task may thus be a portion of operations for the activity that are executed within a single time interval (e.g., a set of operations for the activity that are scheduled to be performed at a given time). In the stock ticker scenario, for example, the activity of refreshing the stock ticker with updated quotes may involve a first task for identifying which stock quotes are provided in the user's ticker, a second task of scheduling a remote procedure call to a server that requests data indicating the updated quotes, a third task of processing and formatting received quotes from the server, and a fourth task of updating the stock ticker graphic in the webpage based on the updated quotes from the server. Additional tasks may be performed by the server, of course, for example, to actually obtain the updated stock quotes and provide the quotes in response to the client device's request.

According to the techniques described herein, an activity tracker at the client computing device may track the execution of each task associated with an activity (or each task executed at the client computing device) to determine one or more performance attributes for the activity. The performance attributes can include, for example, the latency (time duration) associated with any individual task, different subsets of tasks, or the total latency for all the tasks in the activity. The information determined by the activity tracker can then be reported and analyzed to provide valuable insight to website operators, application developers, or others about the performance of a given activity by client devices. For example, a developer may be interested in knowing precisely the latency between a time of a user's selection to invoke an activity (e.g., to update the stock ticker) and a time at which the user perceives the activity to be completed (e.g., browser re-renders the web page with updated stock quotes). Some implementations of the client-side monitoring techniques may accurately and reliably enable the determination and provision of such information.

In some implementations, the activity tracker may be configured to track asynchronous activities on a client computing device. An asynchronous activity is generally an activity that includes at least one asynchronous task. An asynchronous task is generally a task that does not block performance of other computer operations before the task returns a result. For example, in the stock ticker example, a client device may invoke an asynchronous task that requests updated stock quote information from a server system. There is at least some latency involved in generating the request for the updated information, transmitting the request to the server, and receiving the updated information. Because the task is invoked asynchronously, however, the computing device may, after transmitting the request to the server system, move on to perform other operations while the computing device waits for a response to the request from the server system. At a later time, upon identifying that the server has responded, the response may be processed by the computing device, and additional tasks may be invoked to complete the activity using the updated stock quotes indicated by the server's response.

It should be appreciated that, although some of the tasks described herein by way of example correspond to logical stages of an activity, not all tasks may conform to this model. Instead, for example, a task may be any portion of work that is scheduled to be performed for an activity at one time. For example, in a single-threaded computing environment that executes just one thread of operations at a time, the device may schedule a first series of operations to be performed for a first activity during a first time interval, may then schedule a series of operations related to a different activity during a second time interval following the first time interval, and may then schedule a third series of operations to be performed for the first activity during a third time interval following the second time interval. The first series of operations and the third series of operations, whether logically related or not, may each be referred to as a respective task for the first activity. In some implementations, each task may be defined a respective portion of computer code for an activity.

In some implementations, the techniques described herein may be carried out by an application on a client computing device that employs a scripting engine, such as by a web browsing application that employs a JAVASCRIPT® engine (or another scripting engine). As used throughout this document, the term engine refers to a set of computing hardware that is specially configured to execute machine readable instructions that cause the set of computing hardware to perform specific functionality. In such implementations, the framework for the activity tracker may be specified by scripted code that is interpreted and run by the client device. For example, a web page that includes JAVASCRIPT® code for performing asynchronous activities in response to user interactions with the web page may include additional JAVASCRIPT® code to implement an activity tracker to track the performance of these activities. The activity tracker may, for example, intercept tasks that are about to be performed by the computing device, re-write the code for the tasks to include pre-work and post-work operations for starting and pausing an activity timer, and logging information about execution of the task.

The scripting engine may be single-threaded, such that only a single task for any of the activities defined in the webpage can be executed by the device at a time. Scripting engines, such as a JAVASCRIPT® engine, may implement an event loop that allows scripted activity tasks to be performed asynchronously using callback functions. The scripting engine may maintain (e.g., as digital data stored in a physical data structure, such as a computer memory device) a messages queue that includes a list of messages to be processed by the computing device and indications of callback functions associated with the messages. The browser may periodically poll the messages queue to identify the next message in the queue and then execute its associated callback function (and clear the message from the queue). The callback function may in turn generate additional messages that are added to the queue and associated with a callback function. The callback functions can each be a task associated with an activity. In this way, subsequent tasks in an activity can be dynamically (e.g., automatically) scheduled by preceding tasks for the activity. As described in greater detail with respect the figures, the activity tracker can in some implementations be implemented in this framework to cause pre-work and post-work tracking operations to be performed immediately before and after all or some of the tasks for an activity at a client device, to determine useful information such as the durations of tasks associated with an activity.

FIG. 1 depicts a conceptual timing diagram 100 of an example activity performed in part on a client computing device and in part on a server. The diagram generally illustrates how asynchronous tasks for an activity may be scheduled and executed and how a status of the activity can change over time according to rules implemented by an activity tracker on the client device.

Three rows are shown in the timing diagram 100, separated by the horizontal dotted lines, with each of the rows corresponding to a different processing thread. Each of the rows indicates information about an aspect of the activity at a series of times between time $t_0$, when the activity begins, and time $t_7$, when the activity ends. In particular, the top row represents a browser thread 102, the middle row represents a server thread 104, and the bottom row represents the current activity status 106. The client thread 102 identifies times when a client computing device is executing code associated with an activity. In the examples described herein, the client thread 102 is single-threaded, such that only code associated with a single activity can be executed by the client device at any one time. This model is employed by scripting engines such as JAVASCRIPT® engines in common web browsing applications.

For example, consider an example activity related to integrating a targeted advertisement (or other third party content obtained from various disparate sources) into a presentation of webpage for a given user. The webpage may employ asynchronous techniques that allow other portions of the web page to load and be rendered on a screen while an appropriate advertisement (or other third party content) is being fetched for the user. In other words, loading the advertisement should not block other content of the web page from being loaded or prevent user interaction with the page as the advertisement is loaded. In this example, each of the blocks 108, 114, 116, 118, and 120 in the client thread 102 indicate chunks of asynchronous work (e.g., tasks) that are performed by the client device 102 for the advertisement loading activity. The advertisement may be retrieved from an ad server located over a network remote from the client computing device, and so the server thread 104 further includes additional blocks 110 and 112 that represent work (e.g., tasks) performed by the server related to the activity. The server may be either single-threaded, such that only one task can be performed at a time, or multi-threaded, such that multiple tasks can be performed concurrently. As shown in FIG. 1, the server thread 104 in this example is multi-threaded, as the server here performs tasks 110 and 112 concurrently from time $t_2$ to time $t_3$.

The third row represents the current activity status 106 at each time from $t_0$ through $t_7$. In some implementations, the activity tracker can store information that describes the status of an activity at various times during its lifecycle. The status of the activity may be determined according to a set of rules that enable reliable tracking of the activity across multiple tasks executed at different times. The rules provide that, at any given time, a status may take on one of three statuses: (1) active, (2) pending, and (3) ended. An 'active' activity is one that is presently being executed by the client computing device. A 'pending' activity is one that is not being presently executed by the client computing device, but that is not yet ended. An 'ended' activity is one for which there are no additional tasks to be performed by the client computing device related to the activity. In many cases, an activity may be 'ended' due to the activity having completed performance. However, an activity may be 'ended' for other reasons as well, such as a user's cancellation of an activity before completion, or due to an error occurring that prevents completion of an activity. Moreover, because the scripting engine on the client device is assumed to be single-threaded, at any given moment only one activity can be designated 'active' at a time.

In some implementations, an activity may be marked active during any asynchronous work performed by the client device associated with the activity, including at times when the client device is scheduling a remote procedure call to the server and when the client device is scheduling tasks related to the activity that are to be executed at a future time. Finally, the rules may provide two situations in which an activity may be set as active: (1) from the time the activity is first invoked until the initial chunk of work (e.g., task) associated with the activity ends, and (2) during any subsequent asynchronous work (e.g., tasks) associated with the activity including callbacks from remote procedure calls.

Figure 2:
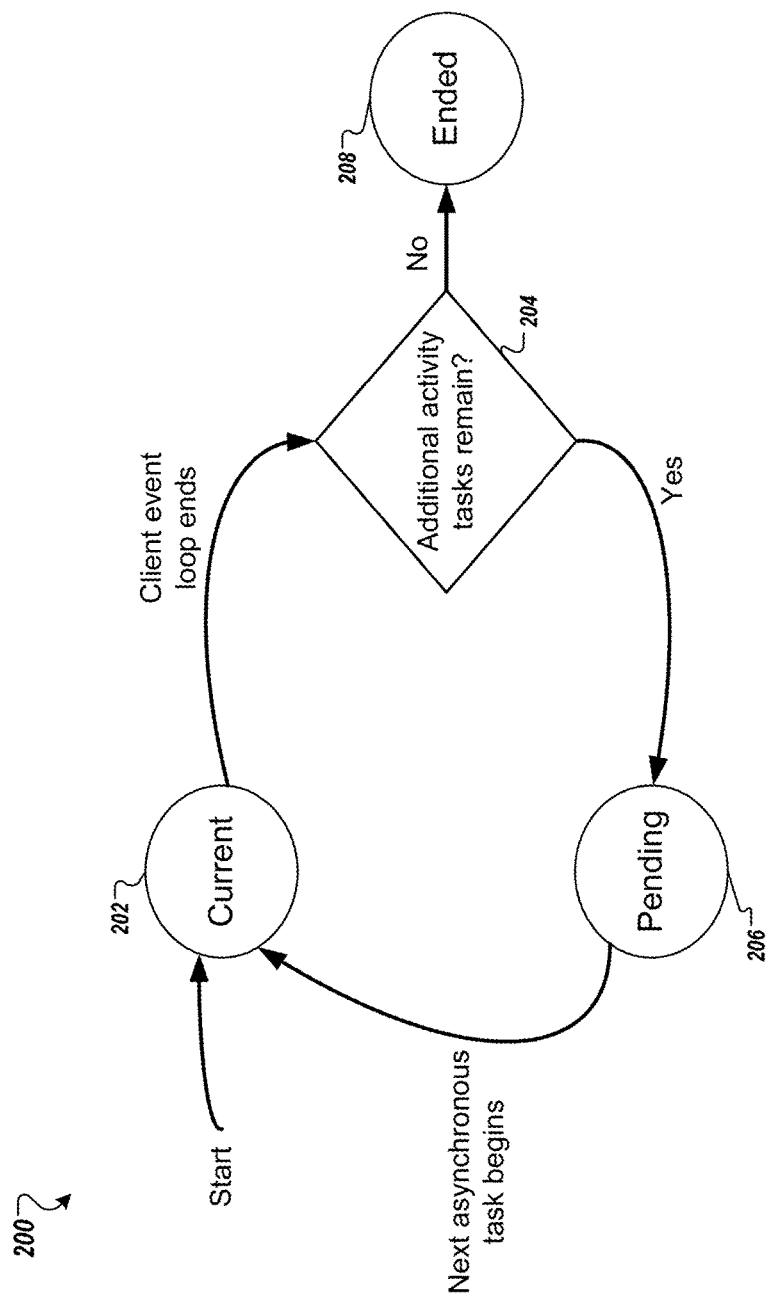
FIG. 2 is an example state transition diagram that illustrates activity statuses moving between active, pending, and ended statuses according to a set of rules.

Turning briefly to FIG. 2, an example state diagram is shown having transitions between activity statuses according to the rules described herein. At stage 202, an activity is started, such as in response to user interaction with a web page at a client device that indicates the user's intent to invoke the activity. The client device may then begin performing the activity by executing a first asynchronous task. During execution of the first asynchronous task, the activity is marked current at stage 202. In some implementations, the task may be interpreted and/or executed by a scripting engine on the client device, such as a JAVASCRIPT® engine in a web browsing application that employs an event loop to asynchronously perform the task. Upon completion of the first asynchronous task, the event loop ends and the activity tracker checks a scheduling queue (task queue), for example, to determine whether additional asynchronous tasks have been scheduled for the activity (stage 204). If no additional tasks are scheduled, then the activity status is transitioned to 'ended,' as indicated at stage 208. If the activity tracker determines from the scheduling queue that additional tasks are scheduled to be performed for the activity (i.e., determines that the activity is not ended), then the activity is marked upon completion of the first asynchronous task as 'pending,' as indicated at stage 206. Later, when the next asynchronous task for the activity is executed, the status of the activity is again marked as 'active.' The transition of activity status between 'active' and 'pending' can be repeated one or more times until no further tasks are available to be performed for the activity, in which case the activity is marked 'ended.'

Referring again to FIG. 1, the stages and corresponding statuses of an example activity will now be described as the activity progresses from $t_0$ to $t_7$. At $t_0$, the client thread 102 begins execution of the first asynchronous task 108 associated with the activity. In some implementations, this can occur during the first event loop on a client device in response to a triggering event that invokes performance of the activity (e.g., user selection of a control in a graphical user interface of a web page or application). From $t_0$ to $t_1$ the first task 108 executed in the client thread 102. Beginning at time $t_1$, the task 108 makes a first remote procedure call to the server remote from the client device. The first remote procedure call may be transmitted over a network to the server, and at $t_1$ (or shortly after $t_1$ due to the network transmission time), the server thread 104 invokes a second task 110. For the duration of the first task 108 as it is executed in the client thread 102, the current activity status is 'active.'

At time $t_2$, the event loop on the client device ends, and thus performance of the first task 108 ends with it. From time $t_2$ to time $t_3$, the client thread is not executing any task, or otherwise performing work associated with the activity. As such, the activity tracker can mark the status of the activity from $t_2$ to $t_3$ as 'pending.' During this period, the client device is not necessarily inactive. Rather, because the client may execute tasks asynchronously, for example, tasks associated with other activities may be executed while awaiting a response to the first remote procedure call for the particular activity diagrammed in FIG. 1. Also, because 'active' status is generally tied to whether the client device (and not the server) is presently executing a task associated with an activity, the fact that the server thread 102 is performing work for the activity from $t_2$ to $t_3$ does not make the activity status 106 'active' during this period. Also at $t_2$, before the first task 108 ends, the client thread 102 makes a second remote procedure call, which in turn causes the server thread 104 to invoke a second server task 112. The server may be multi-threaded, for example, thereby allowing the server tasks 110 and 112 to execute concurrently for at least a portion of their respective durations.

At time $t_3$, the client device receives a response from the server to the first remote procedure call, which causes a task 114 to be invoked in the client thread 102 to process the response. For example, the server's response may be placed in a messages queue that associates the response message with a callback function. The client may poll the message queue to identify that a response to the first remote procedure call has been received, and in response executes the associated callback function as task 114. During execution of task 114, the status of the activity is 'active.' At time $t_4$, task 114 begins immediately following task 114 (or task 116 may be a terminal portion of task 114). Based on a result of processing the response to the first remote procedure call, the client device at $t_4$ may asynchronously update the user interface of the web page or application. The activity status remains 'active' from $t_4$ until the completion of task 116.

Meanwhile, from $t_4$ to $t_5$, the network thread 104 continues to process the task 112 that was invoked in response to the second remote procedure call. For the portion of this interval following completion of the client's task 116, the activity is marked with a 'pending' status. At time $t_5$, the task 112 completes, and a response message is transmitted to the client device. In some implementations, the response message may be added to the client's asynchronous message queue and associated with a callback function. Upon receiving the message, the client device can process the response to the second remote procedure call (e.g., to de-serialize the response). This processing is represented by the block for task 118 in the client thread 102. Based on a result of the processing, an additional task 120 is scheduled and executed in the client thread 102 from time $t_6$ to time $t_7$. The activity tracker can mark the activity status 106 for the activity as 'active' during performance of both tasks 118 and 120.

At time $t_7$, the client thread 102 completes performance of the final task 120 for the activity, and the activity tracker then changes the status of the activity from 'active' to 'ended.' In some implementations, the activity tracker can determine that the activity has ended by checking a task queue to determine whether any additional tasks have been scheduled for the activity. If additional tasks have been scheduled, then the activity tracker can recognize that the activity is not completed, and therefore marks the activity as 'pending.' If additional tasks are not scheduled in the queue, however, then the activity tracker can recognize that the activity is completed, and therefore marks the activity as 'ended.'

In some implementations, an activity tracker at the client device can monitor the performance of the activity over the course of its execution. For example, the activity tracker may track the time durations of individual tasks for the activity, so that a total latency associated with the activity can be determined by aggregating the durations of all or some of the activity's tasks. Thus, to determine the total latency of the activity depicted in the timing diagram of FIG. 1, the activity tracker may determine the respective durations of tasks 108, 114, 116, 118, and 120 from the client thread 102, and may further add in the times where the client was waiting for a server response to a remote procedure call.

For example, an activities log can be maintained that records the duration (or information usable to determine the duration, such as timestamps that mark times for the beginning and end of each executed task) on the client device. As described further below with respect to FIGS. 3-6, the activity tracker can in some implementations record the times at which remote procedure calls are made and the times that responses to the calls are received from a server. The network latency between making a call and receiving a response can then be reported and/or used to determine other measures of latency, including the total latency of the activity.

In some implementations, the activity tracker may eliminate redundant latencies during times which multiple tasks are running on the network thread 104. For example, to determine the total activity latency in FIG. 1, the activity tracker may take the sum of the execution durations of tasks 108, 114, 116, 118, and 120, and may further add to the sum those times where the activity was pending as the client device awaited a response from the server to the client's remote procedure calls. In some implementations, latencies other than the total activity latency may be calculated using the data collected by the activity tracker. For example, only client-side latencies may be tracked (e.g., the aggregate duration of tasks 108, 114, 116, 118, and 120) and/or the total server latency may be determined separate from the client-side latencies.

Figure 3:
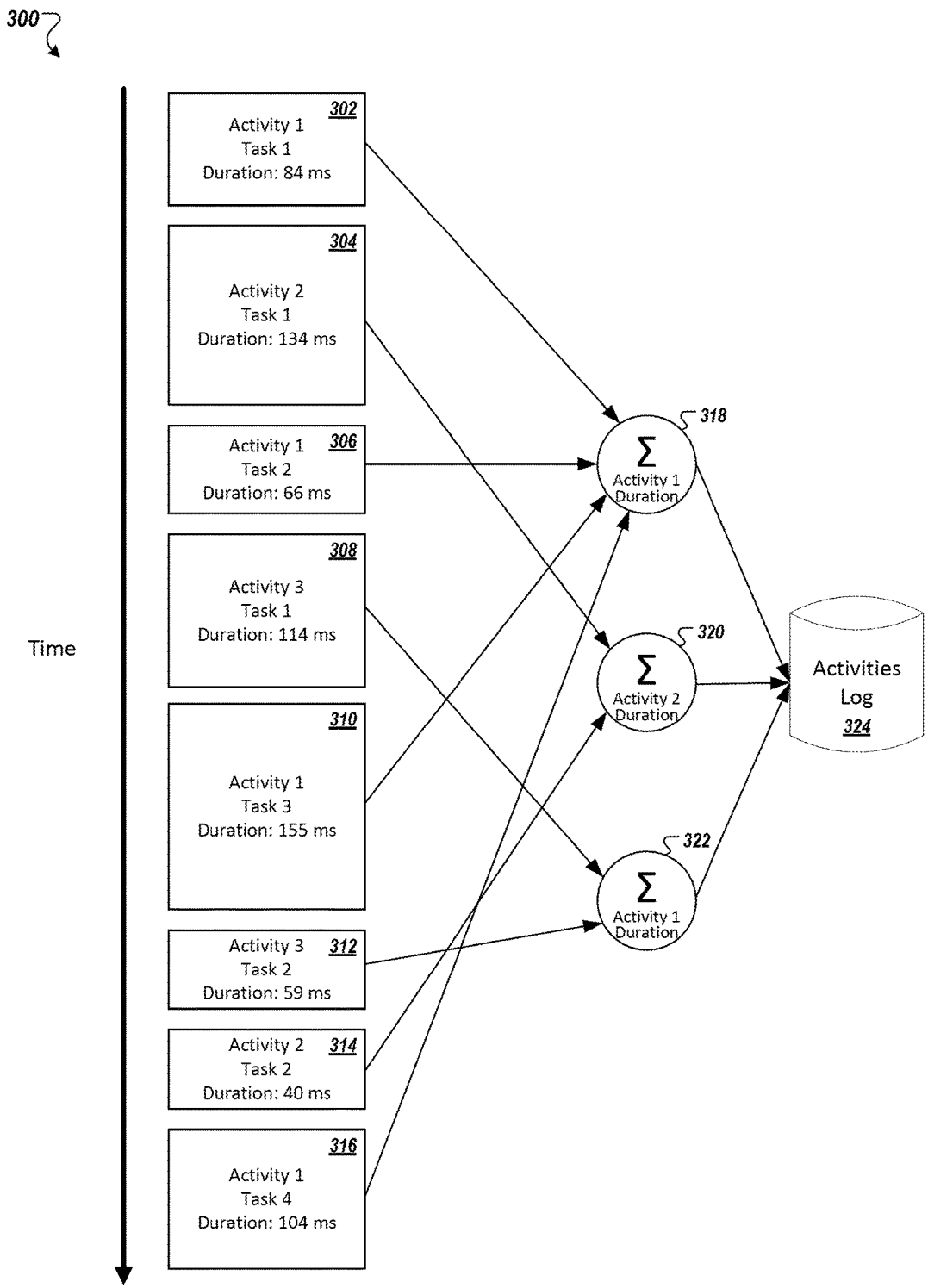
FIG. 3 depicts a conceptual diagram of an exemplary technique for determining respective durations of activities that are asynchronously executed at a client device.

FIG. 3 depicts a conceptual diagram of an exemplary technique for determining respective durations of activities that are asynchronously executed at a client computing device. Although the timing diagram of FIG. 1 shows just a single activity being executed by the client device for illustration purposes, in practice, the client device may execute multiple different activities by multiplexing various tasks for the activity in the single client-side thread 102. For example, a JAVASCRIPT® engine in a web browser may perform automatic asynchronous updates to portions of content in a web page, even as the engine also responds to user interactions that require a near-immediate response. One benefit of executing tasks asynchronously is that they need not block performance of other tasks until a calling task has been completed. For example, in FIG. 1, the client thread 102 could execute tasks for other activities during the interval from $t_2$ to $t_3$ while the first activity is 'pending.' Of course, the asynchronous nature of the tasks can make it more difficult to determine activity properties such as total activity latency, because tasks for other activities may be performed in time slots between execution of tasks for the target activity. For example, an application developer may wish to isolate the latencies associated only with tasks corresponding to the target activity being tracked, while removing other latencies for tasks that correspond to other latencies. Thus, even though a user may experience a 2.3 second delay between a user interaction that invokes a target activity and completion of the activity, only 1.1 seconds of the latency may be attributed to the target activity itself, while the other 1.2 seconds may be attributed to one or more other activities having tasks that executed between certain task of the target activity.

In the example of FIG. 3, eight tasks 302-316 are depicted as being executed in succession by a single-threaded scripting engine at a computing device over a period of time, as indicated by the vertical time bar at the left portion of the figure. The task that is first executed among this set is task 302, which is the first task for Activity 1. An activity tracker at the client device, which may be implemented in some implementations as scripted code in a web page or application, starts a timer for Activity 1 when it begins executing in the client thread and pauses the timer when the task 302 is completed.

Following task 302, the asynchronous task 304 is executed as the first task for a different, second activity (Activity 2). The activity tracker marks Activity 2 as active and starts a timer for Activity 2 when task 304 begins executing. Once task 304 is completed, the activity tracker pauses the timer 304 for Activity 2 and records the duration of the task 304 in the activities log. Similar operations can be performed for each of the subsequently executed tasks 306-316 for Activities 1 and 2, and also for Activity 3 so that the individual time durations of each of tasks 306-316 is captured or added to the respective timer for each of the Activities 1, 2, and 3.

When a given activity has ended, the time durations for each of the tasks associated with the given activity can be summed or otherwise aggregated to determine total activity latency. For example, the total activity latency 318 for Activity 1 may be based on the respective durations of tasks 302, 306, 310, and 316. Likewise, the total activity latency 320 for Activity 2 may be based on the respective durations of tasks 304 and 315, and the total activity latency 322 for Activity 3 may be based on the respective durations of 308 and 312. The total activity latencies 318, 320, and 322 may be stored in an activities log 324 on a client computer or on a server, in some implementations.

Figure 4:
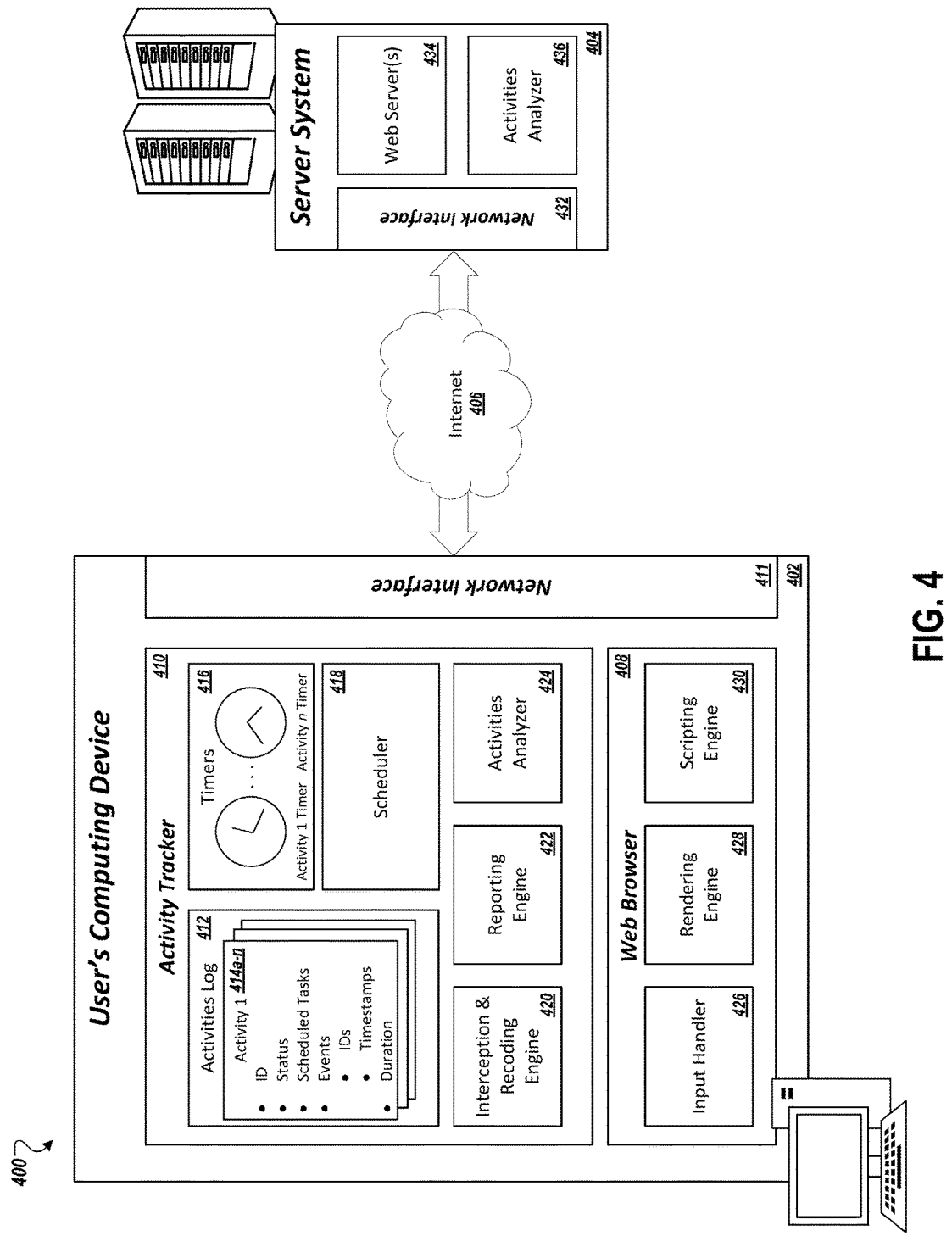
FIG. 4 is a block diagram of an example computing system for tracking latencies of activities at a client computing device.

Referring now to FIG. 4, a block diagram is shown of an example system 400 for tracking latencies of activities at a client computing device 402. In some implementations, the system 400 may carry out the processes and computer-implemented methods described herein, including processes 502 and 504 (FIGS. 5A and 5B) and process 600 (FIGS. 6A and 6B). The system 400 generally includes a client computing device 402 and a computer server system 404, which communicate over a network 406 such as the Internet. Although certain components of the system 400 are depicted in a certain arrangement by way of illustration, other arrangements are also possible. For example, the activity tracker 410 may be a component of the web browser 408, or individual components of the activity tracker 410 may be realized by either the activity tracker 410, the browser 408, or both.

The client device 402 can generally be any type of user computing device such as a desktop computer, a notebook computer, a netbook, a smartphone, a tablet computing device, or a smartwatch or other wearable device. In some implementations, the client device 402 may be a type of connected, smart device (e.g., an Internet of Things device) such as a computer-based power outlet, kitchen appliance, smoke detector, or thermostat. The computing device 402 can include a web browser 408, an activity tracker 410, and a network interface 412.

The network interface 412 is enabled to communicate with other computing devices over one or more networks. The network 406 may be a wired or wireless network and may be a local area network or a wide area network, for example. In some implementations, the network interface 412 is enabled to communicate over the Internet with a server system 404. The server system 404 may include one or more computers that provide content to the client computing device 402. The server system 404 may push content to the client computing device 402 and/or may provide content to the client device 402 in response to requests initiated by the client device 402. In some implementations, the server system 404 may include a web server 434 for hosting web pages and web-based applications.

In some implementations, the server system 404 may instrument content that it serves to the client device 402 with computer code (e.g., JAVASCRIPT® or another script) that implements an activity tracker 410 at the client device when the client device 402 executes the instrumented content. For example, the server 434 may embed or reference JAVASCRIPT® code in an HTML file for a web page. The JAVASCRIPT® code may be configured to perform the actions of activity tracker 410 with respect to one or more activities that may result from the web page when it is executed by the web browser 408.

In some implementations, the server system 404 may include an activities analyzer 436. That activities analyzer 436 on the server system 404 may perform similar operations as the activities analyzer 424 on the client device 402. For example, the activities analyzer 436 may process information recorded in the activities log 412 to determine performance characteristics of an activity such as the total latency for an activity, or latencies for certain portions of the activity. In some implementations, one or more parameters of content served from the server system 404 can then be adjusted to optimize performance characteristics of content subsequently served to client devices (e.g., reduce activity latencies for activities that may be invoked from the content). In some implementations, reports can be generated that show latencies or other performance characteristics of one or more activities performed by the client device. The activities analyzer 436 may also use sophisticated statistical techniques in some implementations to determine characteristics of different client devices that may account for differences in latencies or other performance characteristics of activities at the client devices.

The web browser 408 at the client device 402 may be a standard web browsing application that is capable of presenting web pages, running scripted code (e.g., JAVASCRIPT®), and executing web-based applications. The web browser 408 may include an input handler 426, a rendering engine 428, and a scripting engine 430. The input handler 426 is generally operable to receive user input directed to web pages or other content that is presented by the web browser 408. For example, the input handler 426 may include a keyboard handler to detect typed input, a voice handler to detect spoken input, a touch handler to detect touchscreen gestures, and/or a pointer handler to detect mouse or stylus input. The input handler 426 may monitor one or more user input channels to detect when user input has been received to the web browser 408, and can alert (e.g., by interrupts) other components of the browser 408 when such input has been detected. For example, the input handler 426 may detect that user has selected—via touch, voice, or otherwise—a menu item in a web page that calls an asynchronous activity to be performed.

The rendering engine 428 is generally operable to parse web code and to generate a graphical presentation of a web page for presentation to a user. In some implementations, the rendering engine 428 parses hypertext markup language (HTML) and associated code (e.g., Cascading Style Sheets (CSS), JAVASCRIPT®) to construct a document object model (DOM) representation of a web page, and to then build a graphical presentation of the web page based on the DOM. The scripting engine 430 is generally configured to interpret and execute scripts in web pages or other content loaded by the web browser 408. In some implementations, the scripting engine 430 may be a JAVASCRIPT® engine that enables web pages to include asynchronous activities that are executed by the scripting engine 430.

The activity tracker 410 at the client device 402 is generally configured to track the performance of activities that are executed at least in part at the client device 402. For example, the activity tracker 410 can collect data about activity execution that is usable to determine activity latencies. In some implementations, the activity tracker 410 can include an activities log 412, activity timers 416, a scheduler 418, an interception and recoding engine 420, a reporting engine 422, and an activities analyzer 424. The activity tracker 410, scheduler 418, interception and recoding engine 420, reporting engine 422, and activities analyzer 424 can each be implemented as a set of computing hardware (e.g., one or more processors) that is specially configured to execute machine readable instructions that cause the set of computing hardware to perform specific functionality as describe herein.

The interception and recoding engine 420 can identify that an activity in a web page being presented by the web browser 408 has been invoked and is about to be executed. In some implementations, the interception and recoding engine 420 may intercept calls to invoke an activity by software that re-directs such calls to the activity tracker 410 before the call is executed by the web browser's scripting engine 430. For example, when a user selects a control in a graphical interface of a web page to invoke an asynchronous activity, the input handler 426 can identify input and alert the scripting engine of the event. The scripting engine 430 can identify a task that is to be performed for the activity and can provide the interception and recoding engine 420 with an indication of the task. The interception and recoding engine 420 can then rewrite or otherwise modify the computer code for the task to include pre-work operations, post-work operations, or both pre-work and post-work operations.

The pre-work and post-work operations may cause the scripting engine 430 to perform operations defined by the activity tracker 410 when the rewritten task code is executed by the scripting engine 430. For example, the pre-work operations, when executed, may cause the scripting engine 430 to output an identifier of the activity that the task is associated with, to generate an entry in the activities log 412 that marks the status of the task as 'active,' and to start a timer 416 for the activity. After the pre-work operations are completed, the actual task may be executed.

At the end of the task, the post-work operations 430, when executed, may cause the scripting engine 430 to check a task queue in the scheduler 418 to determine whether any additional tasks are scheduled to be executed for the activity. If the task queue indicates that no additional tasks are scheduled to be performed, or if it is otherwise determined that an activity is completed, then the post-work operations when executed may stop the timer, update the activities log 412 to record the time duration of the task, and mark the current status of the activity as 'ended.' If, however, the task queue indicates that at least one additional task has been scheduled for the activity, or if it is otherwise determined that an activity is not ended, then the post-work operations when executed may pause the timer (which can later be resumed when the next task is executed), update the activities log 412 to record the time duration of the task, and mark the current status of the activity as 'pending.' In some implementations, the activity tracker can generally enforce the rules for marking activity statuses in the manner described with respect to FIGS. 1 and 2.

Figure 5A:
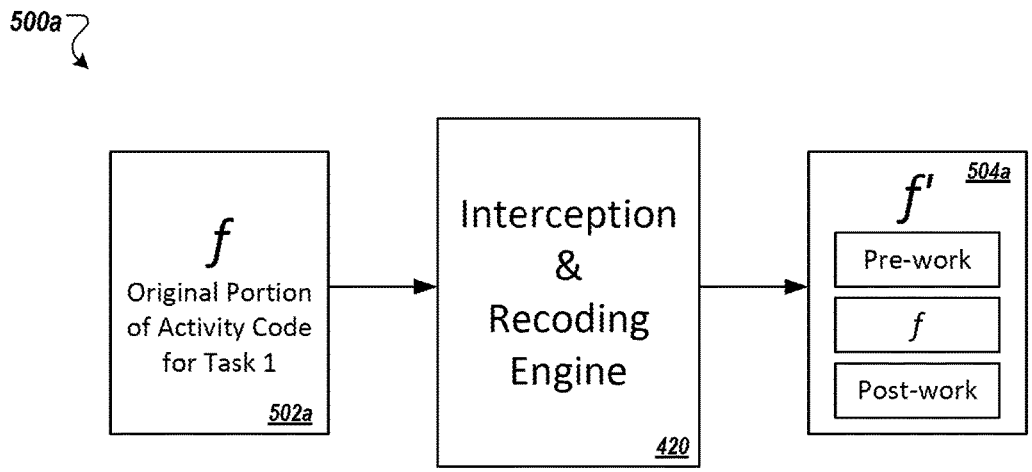
FIGS. 5A and 5B provide flowcharts of example processes for modifying computer code of asynchronously executed tasks so as to implement activity tracking functions.
Figure 5B:
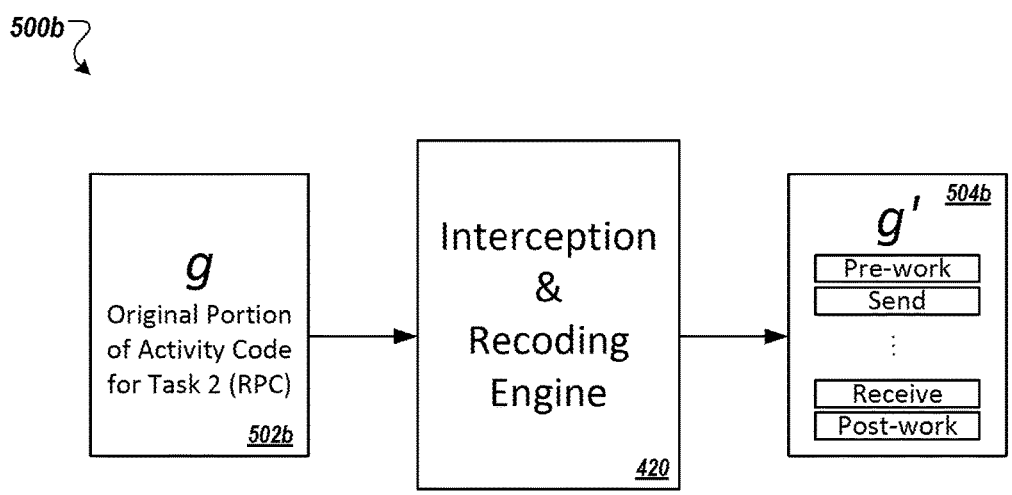
Figure 6A:
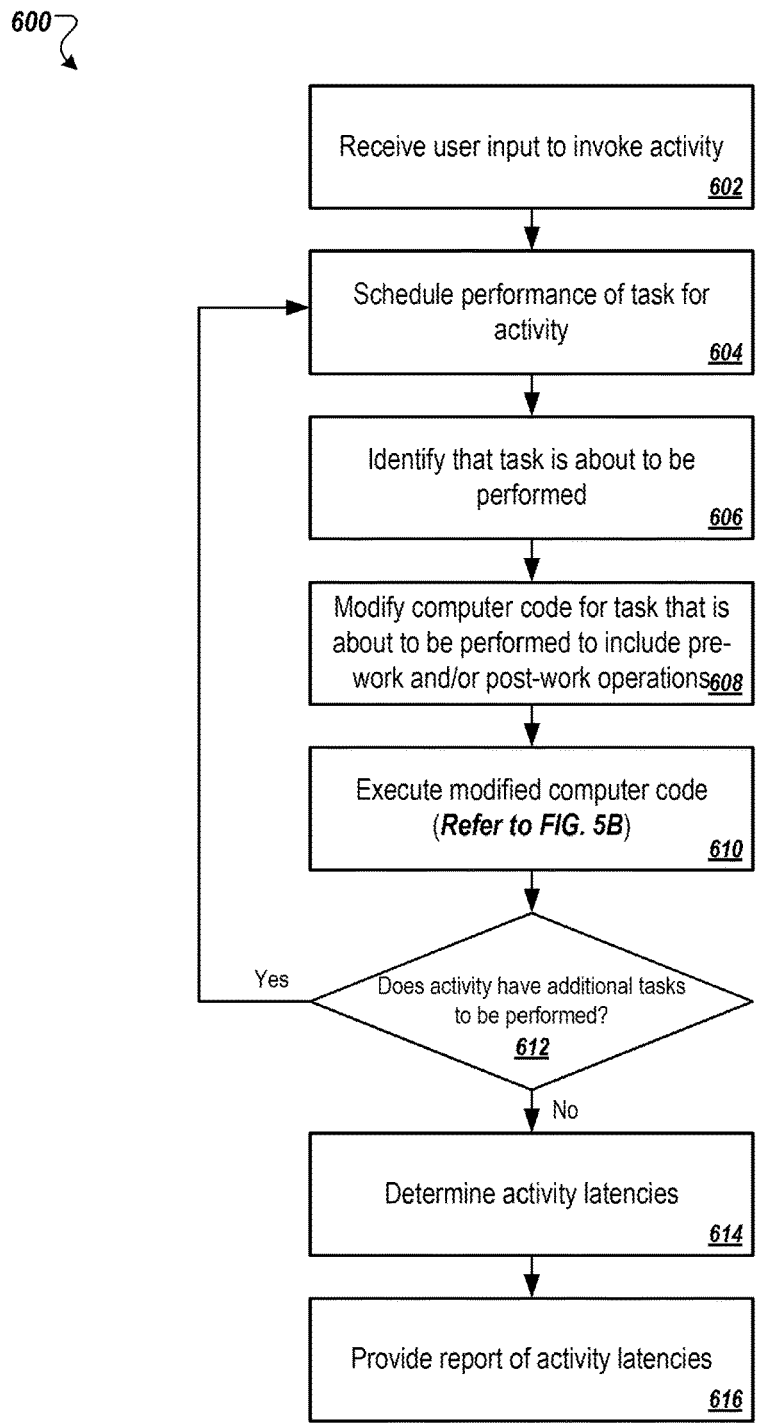
FIGS. 6A and 6B depict flowcharts of an example process for tracking latencies of asynchronous activities at a computing device.
Figure 6B:
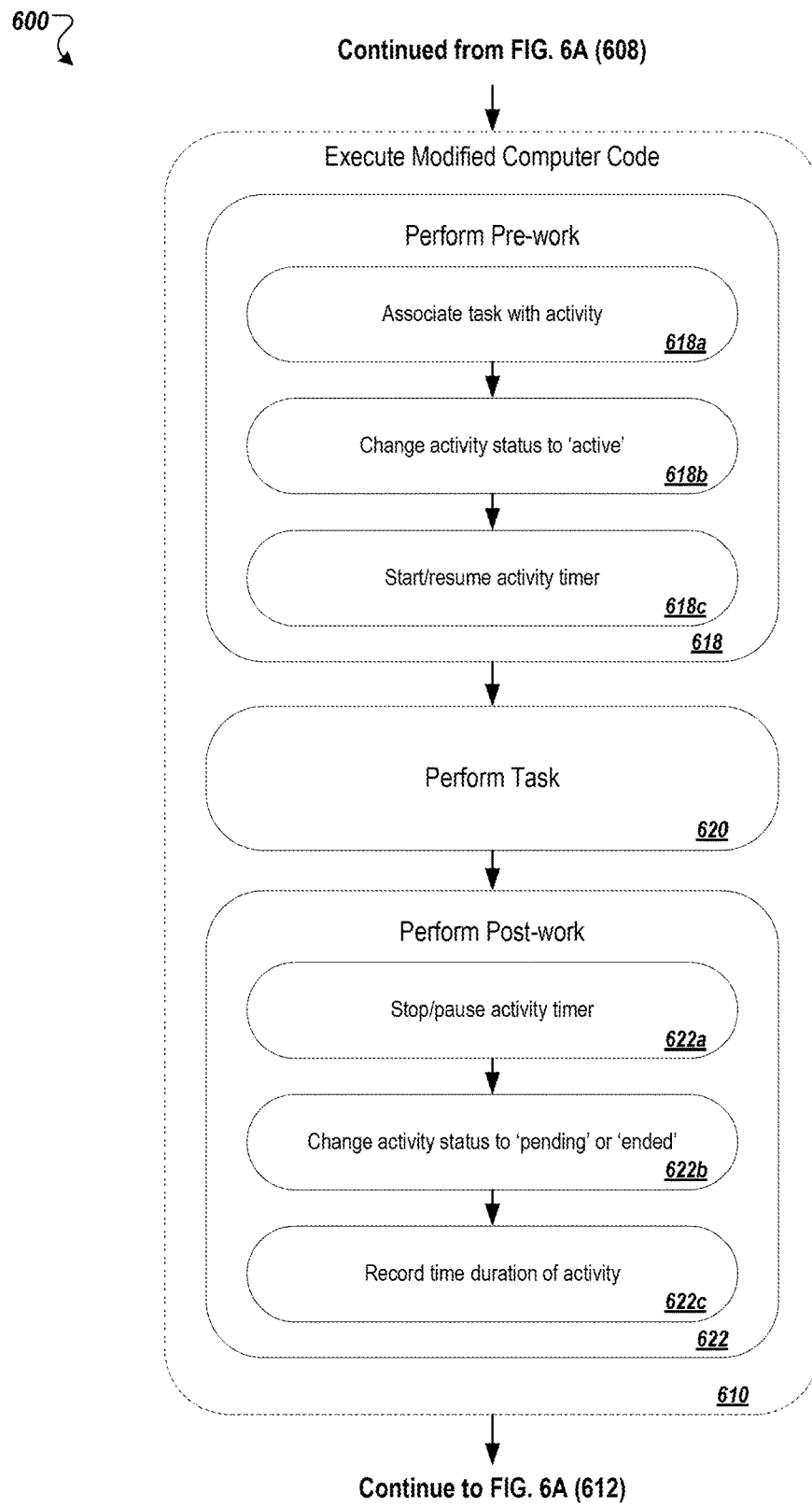

FIGS. 5A and 5B depict examples of transformations that the interception and recoding engine 420 may perform on activity code associated with a particular task. In particular, FIG. 5A depicts recoding of an asynchronous task that is to be executed on the computing device 402. The original code 502a associated with the task can be provided to the interception and recoding engine 420, and a modified version of the code 504a generated. The modified code 504a includes pre-work operations, the original code for the task, and post-work operations. The modified code 504a can then be executed in some implementations by the scripting engine 430 in the browser 408.

FIG. 5B depicts the recoding of code for a task that involves making a remote procedure call to the server system 404 or another server. In this example, the original code 502b is again recoded to generate modified code 504b, including pre-work and post-work operations. The pre-work operations for the remote procedure call may start a timer that identifies the time at which the call was made to the server. After the timer is initiated, any other pre-work operations are completed, and the remote procedure call is made, other tasks may be performed until a response to the remote procedure call is received at the computing device 402. Upon detecting the response to the remote procedure call, a callback may made to execute the post-work operations, which stops the timer so that the network latency can be determined between when the computing device 402 made the remote procedure call and when the computing device 402 received the response to the remote procedure call.

In some implementations, the activity tracker 410 can include one or more additional components that enable monitoring of the latency or other performance characteristics of an activity. The activities log 412 can include information recorded at the computing device 402 about the one or more activities that active, pending, or ended. The activities log 412 may include records 414a-n for each activity, and the records 414a-n may include entries for events related to the respective activity. An entry may indicate, for example, a unique activity ID, a unique task ID, the current status of activity, accumulated duration of the activity, and timestamps that identify when events occurred such as the beginning and end of execution of a task. The reporting engine 422 may from time to time transmit the activities log 412 to the server system 404 to allow the activities analyzer 436 to process the log 412. In some implementations, a scheduler 418 interacts with a task queue on the computing device 402 to schedule asynchronous tasks. The task queue may be polled by the browser 408, for example, and may execute one or more tasks that the scheduler 418 has listed in the queue.

FIG. 6A depicts a flowchart of an example process 600 for tracking the latencies of asynchronous activities at a computing device. In some implementations, the process 600 may be carried out by the devices and systems described herein, including computing system 400 depicted in FIG. 4. Although the flowchart depicts the various stages of the process 600 occurring in a particular order, certain stages may in some implementations be performed in parallel or in a different order than what is depicted in the example process 600 of FIG. 6.

At stage 602, a computing device receives input to invoke an activity. In some implementations, the input may be received from a user, such as through a selection of a control in a web page or in a graphical user interface of an application on the device. The computing device may recognize the input as an instruction to invoke an activity immediately upon receiving the input, or after a specified delay. For example, the input handler 426 can detect the user input and communicate with other components of the web browser 408 and/or activity tracker 410 to respond to the input. In some implementations, other triggering events may cause the computing device to invoke performance of an activity. For example, a web page may autonomously perform asynchronous updates or other activities at pre-defined times or upon the detection of other non-user initiated events.

At stage 604, in response to receiving the user input, the computing device schedules a first task to be performed for the activity. The first task, and other tasks for the activity, may be asynchronous such that, after a given task has been called, other tasks for the same or another activity may be executed by the computing device as a response is being determined for the given task. Thus, asynchronous activities may be completed by individually performing a series of individual tasks associated with the activity, where each task represents a portion of the overall work required to complete the activity. Each task may be defined by a respective portion of computer code for the activity.

In some implementations, a task can be scheduled by placing an indication of the task in a queue, such as a queue for a browser event loop. The browser may periodically poll the event loop to determine whether any asynchronous tasks have been scheduled for one or more activities, and if so, one or more of the tasks may be performed. The queue may be structured as a first-in-first-out queue, or certain tasks may be prioritized such that a more recently scheduled task jumps precedence over another task and causes the browser to perform the more recent task before the older task.

During execution of a given task, the task itself may include one or more additional asynchronous tasks (e.g., sub-tasks) that require to be performed to complete the activity. Accordingly, a currently executing task may cause the browser or an activity tracker to schedule subsequent tasks for the activity, which are in turn added to the queue. In this manner, all of the tasks that pertain to an activity may not be immediately identified upon receiving the user input; rather, a first task may be identified and subsequent tasks may be chained (scheduled) during execution of the first task and any subsequent tasks until no additional tasks are chained and the activity has completed. In some implementations, the computing device may immediately perform the first task for the activity upon detecting the user input that invokes the activity rather than scheduling the first task to be performed at a later time.

At stage 606, the computing device identifies that a task is about to be performed. For example, if the activity is to be performed in a web page, the browser may poll the queue of scheduled tasks and identify the next task to be performed. In response to identifying the task from the queue, the browser may notify the activity tracker that the task is about to be performed to allow the activity tracker to process the task before it is executed.

At stage 608, a recoding engine in the activity tracker modifies computer code associated with the task to include code that allows the activity tracker to monitor one or more aspects of the task's execution on the computing device. For example, to determine execution latencies, the task may be instrumented with code that records in an activities log, in an entry associated with the particular activity to which the task pertains, a time at which the task begins execution, and that marks a time at which execution of the task ends. The code may also output an identifier of the activity to which the task pertains and may change a current status of the activity among pre-defines states such as 'active,' 'pending,' and 'ended.' In some implementations, code for an activity may be recoded at the time the activity is invoked or on the fly as each task is invoked. In some implementations, code for an activity may be recoded not at the time the activity is invoked or otherwise on the fly, but may instead be recoded at the time the application is compiled. For example, before JAVASCRIPT code for an activity is served to a client device, the server system may rewrite the code to include an activity tracker. The rewriting may include embedding code that causes pre-work and/or post-work operations to be performed at the start and end of all or some of the task for an activity when executed at the client device.

At stage 610, the computing device executes the task as modified by the activity tracker. For example, after the recoding engine has inserted pre-work operations, post-work operations, or both to the code associated with the task that is about to executed, the modified code for the task may be provided back to the scripting engine in the web browser for execution. An expanded representation of stage 610 is depicted in FIG. 6B, including stages 618, 620, and 622.

At stage 618a, the scripting engine executes the pre-work operations for the task. In some implementations, this involves first associating the task with its appropriate activity. For example, a unique activity identifier that has been programmed into the modified task code may be recorded in an activity log so that information collected during execution of the task can be correlated to the proper activity.

At stage 618b, the activity status is marked as 'active.' If the task is the first task executed for a given activity, the activity status is initially set to 'active' during the task's execution. If the task is a subsequent task being executed after one or more other tasks have previously been executed, then the current status may be changed from 'pending' to 'active.'

At stage 618c, a timer associated with the activity is started, such as by recording a start time at which the actual task code associated with the activity begins executing at stage 620. In some implementations, the code for the task that is executed at stage 620 is the original code associated with the task before the code was modified so as to sandwich the original portion between code for pre-work and post-work operations.

At stage 622, the computing device executes code for post-work operations that have been provided in the modified portion of computer code for the task. The post-work operations may include stages 622a-c, or a combination of one or more of these.

At stage 622a, a timestamp is recorded in the activities log that identifies the time that the original portion of computer code for the task ended execution. The start and stop times stored in the activities log can thus indicate an execution time duration of the task.

At stage 622b, the current activity status is changed from 'active' to either 'pending' or 'ended.' To determine whether the status should be changed from 'pending' to 'ended,' the contents of the scheduled tasks queue may be evaluated to determine whether any subsequent tasks are scheduled to be performed for the activity. If no subsequent tasks are scheduled, then the activity status may be changed from 'active' to 'ended.' If there are subsequent tasks scheduled, then the activity status may be changed from 'active' to 'pending.' In some implementations, the time duration of a task's execution may be determined by a timer module that is held in memory until the task's completion, in which case data identifying the time duration of the task's execution may be recorded in the activities log at stage 622c.

Continuing again with the process 600 as depicted in FIG. 6A, at stage 612 the computing device determines whether any additional tasks remain to be performed for the same activity as the activity associated with the task that was executed at stage 610. In response to determining that additional tasks remain to be executed to complete performance of the activity, the process 600 returns to stage 604, and performance of one or more subsequent tasks can be scheduled (e.g., by adding the subsequent tasks to the scheduled tasks queue). In some implementations, subsequent tasks may be scheduled by a scheduler in the activity tracker on the client device before or after execution of the modified task code such that the scheduling is neither part of the task itself or its pre-work or post-work operations. In some implementations, as described with respect to FIG. 6B, the original portion of task code, the pre-work operations, the post-work operations, or a combination of these may be capable of scheduling subsequent tasks during execution of the modified code for the task.

In response to determining that no further tasks remain to be executed to complete performance of the activity, the process 600 progresses to stage 614 to determine one or more measures of latency associated with an activity. In some implementations, the client device that performed the activity may calculate the latencies locally. For example, a total time duration of the activity may be calculated based on the individual time durations of each task associated with the activity. Portions of the total time duration may also be calculated, such as the total time durations of a subset of tasks for the activity that share one or more common characteristics.

In some implementations, the client device may upload the activities log to a server (stage 616), and the server may perform more sophisticated analysis of the data contained therein. For example, the server may aggregate data in anonymized activities logs from many different client devices to determine latencies or other performance characteristics of activities across large numbers of devices. Moreover, using information obtained about the hardware and/or software environment (e.g., user agent ID, browser or scripting engine version, computing device model) of the client devices on which the activities were performed, the server may correlate patterns in the latencies or other performance characteristics of the activities with features of the hardware and/or software environment in which they were executed. A report may then be generated that describes a result of the server's analysis and presented, for example, to application developers who desire to improve the performance of activities at the client devices.

Figure 7:
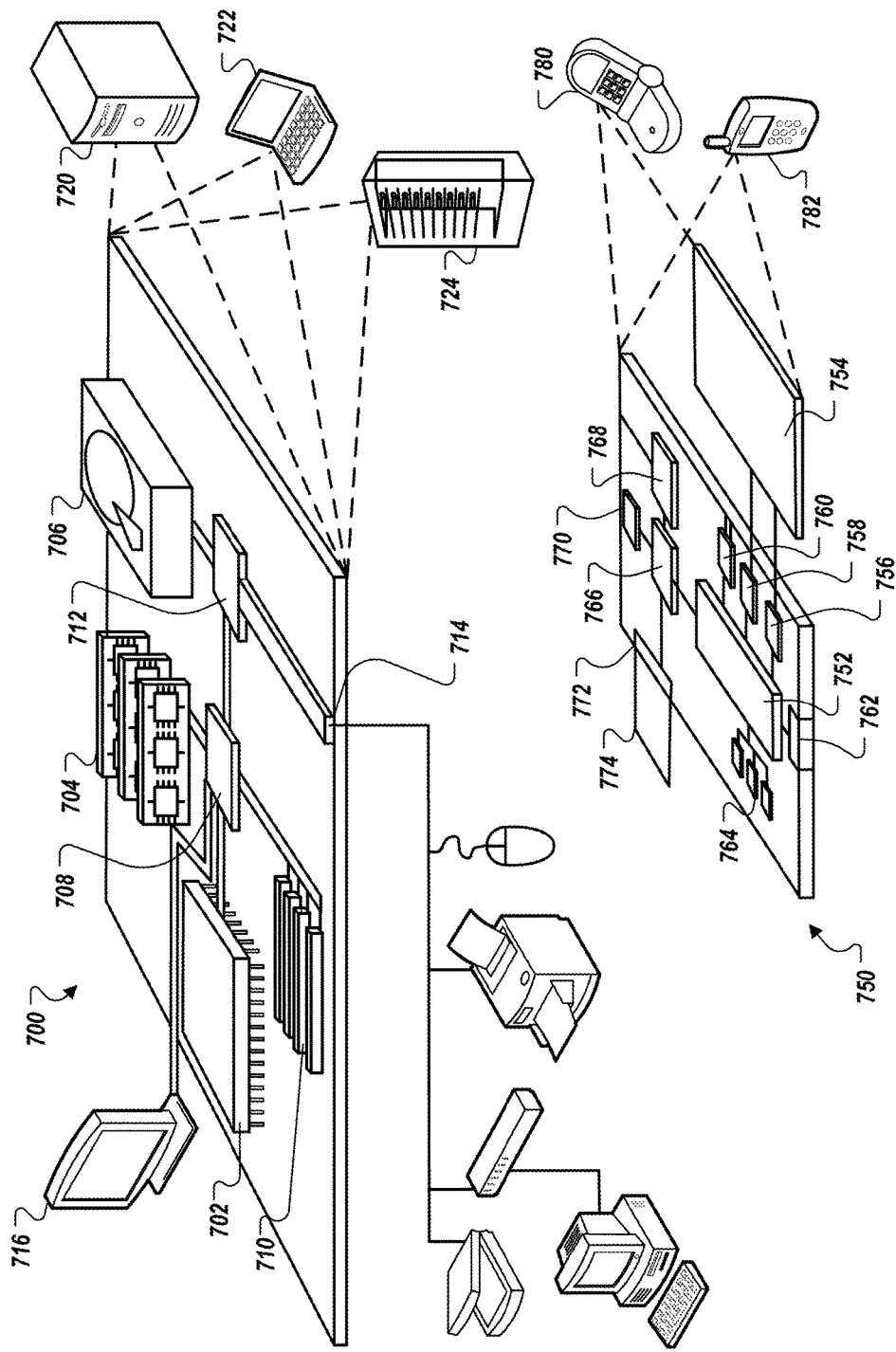
FIG. 7 shows an example of a computing device and a mobile computing device that can be used to implement the techniques described herein.

FIG. 7 shows an example of a computing device 700 and a mobile computing device that can be used to implement the techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Logs (e.g., an activities log) described herein can be implemented as digital data stored in a physical memory structure that is readable by a computer.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computing device, comprising:
   one or more processors;
   a web browsing application:
   a rendering engine that generates a presentation of a web page for display to a user;
   an input handler that detects a user interaction with the presentation of the web page, the user interaction indicating an intent to invoke performance of an activity by the computing device; and
   a scripting engine that executes one or more scripts in web code for the web page; and
   an activity tracker, comprising:
      an intercept engine that intercepts scheduled executions of portions of computer code;
      a re-coding engine that modifies original portions of computer code for the activity before the original portions of computer code are executed by the web browsing application, the modifying including inserting code for pre-work operations that are arranged to be executed before respective original portions of computer code are executed and code for post-work operations that are arranged to be executed after respective original portions of computer code are executed for at least some of the original portions of computer code, wherein the re-coding engine provides the scripting engine with the modified portions of computer code to be executed rather than the corresponding original portions of computer code;
      a timer that tracks one or more execution durations of the activity for the modified portions of computer code; and
      an activities log that stores information that describes the one or more execution durations of the activity.

2. The computing device of claim 1, wherein:
   the code for the pre-work operations, when executed, causes the computing device to change a status of the activity to an active status;
   the code for the post-work operations, when executed, causes the computing device to change the status of the activity to a pending status or an ended status; and
   the activities log further stores information that identifies the status of the activity.

3. The computing device of claim 1, wherein:
   the code for the pre-work operations, when executed, causes the computing device to start or resume the timer for the activity; and
   the code for the post-work operations, when executed, causes the computing device to stop or pause the timer for the activity.

4. A computer-implemented method, comprising:
   receiving, at a computing device, a user input to invoke performance of an activity by the computing device;
   identifying multiple original portions of computer code that perform the activity, wherein each original portion of computer code among the multiple original portions of computer code is scheduled to be executed by the computing device at different times;
   for each respective original portion of computer code among the multiple original portions of computer code that perform the activity:
      intercepting a scheduled execution of the original portion of computer code;
      modifying the original portion of computer code to include (i) pre-work operations that are arranged to be executed before the original portion of computer code is executed, and (ii) post-work operations that are arranged to be executed after the original portion of computer code is executed;
      executing the modified portion of computer code, including executing (i) the pre-work operations for the original portion of computer code, (ii) the original portion of computer code, and (iii) the post-work operations for the original portion of computer code after the performance of the pre-work operations and the original portion of the computer code;
      recording data about the executing of the modified portion of computer code that indicates a time duration of the executing of the modified portion of computer code, and
      determining whether at least one subsequent portion of the computer code is also required to be executed to complete the activity; and
   outputting a total time to completion of the activity based at least in part on aggregating the recorded data about the executing of the multiple original portions of computer code.

5. The computer-implemented method of claim 4, further comprising determining the total time to completion of the activity based at least in part on a sum of the time durations of the multiple original portions of computer code.

6. The computer-implemented method of claim 4, wherein:
   the respective pre-work operations for each modified portion of computer code, when executed, cause the computing device to associate the modified portion of computer code with the activity and to start or resume a timer for the activity; and
   the respective post-work operations for each modified portion of computer code, when executed, cause the computing device to pause or stop the timer for the activity upon completion of execution of the corresponding original portion of computer code for the modified portion of computer code such that the time duration for executing the corresponding original portion of computer code is added to the timer.

7. The computer-implemented method of claim 4, wherein:
   the respective pre-work operations for each modified portion of computer code, when executed, cause the computing device to associate the respective modified portion of computer code with the activity and to record a first timestamp that identifies a starting time for execution of the corresponding original portion of computer code for the respective modified portion of computer code; and
   the respective post-work operations for each modified portion of computer code, when executed, cause the computing device to record a second timestamp that identifies an ending time at which execution of the corresponding original portion of computer code for the respective modified portion of computer code completed.

8. The computer-implemented method of claim 4, wherein:
   the respective pre-work operations for each modified portion of computer code, when executed, cause the computing device to mark in an activity log a status of the activity as active; and the respective post-work operations for each modified portion of computer code, when executed, cause the computing device to mark in the activity log the status of the activity as pending or ended.

9. The computer-implemented method of claim 8, wherein the activity log includes a first entry that indicate the status of the activity and other entries that indicate statuses of other activities performed by the computing device.

10. The computer-implemented method of claim 8, wherein the post-work operations for a first of the modified portions of computer code, when executed, cause the computing device:
to determine whether at least one additional portion of computer code remains to be executed to complete performance of the activity; and
in response to determining that at least one additional portion of computer code remains to be executed to complete performance of the activity, to change the status of the activity in the activity log from active to pending.

11. The computer-implemented method of claim 8, wherein the post-work operations for a first of the modified portions of computer code, when executed, cause the computing device:
to determine whether at least one additional portion of computer code remains to be executed to complete performance of the activity; and
in response to determining that no additional portions of computer code remain to be executed to complete performance of the activity, to change the status of the activity in the activity log from active to ended.

12. The computer-implemented method of claim 4, further comprising scheduling the modified portions of computer code for the activity to be asynchronously executed in a single thread such that the computing device executes only one of the modified portions of computer code at a time.

13. The computer-implemented method of claim 4, comprising:
executing, by the computing device, a first modified portion of the computer code for the activity among the multiple modified portions of the computer code for the activity;
executing, by the computing device and after executing the first modified portion of the computer code for the activity, at least a portion of modified computer code for a different activity; and
executing, by the computing device and after executing at least the portion of the modified computer code for the different activity, a second modified portion of the computer code for the activity,
wherein the total time to completion of the activity includes respective time durations of executing the first modified portion of the computer code for the activity and the second modified portion of the computer code for the activity, but does not include a time duration of executing the at least the portion of the modified computer code for the different activity.

14. The computer-implemented method of claim 4, wherein the multiple original portions of computer code comprise respective portions of scripting code.

15. The computer-implemented method of claim 4, wherein a first portion of modified computer code among the multiple modified portions of computer code for the activity, when executed, causes the computing device to transmit a remote procedure call to a server system remote from the computing device; and
the method further comprises:
receiving, at the computing device and from the server system, a response to the remote procedure call; and
recording, at the computing device, data that identifies a length of time that elapsed between transmitting the remote procedure call to the server system and receiving the response to the remote procedure call.

16. The computer-implemented method of claim 15, further comprising determining the total time to completion of the activity based at least in part on the length of time that elapsed between transmitting the remote procedure call to the server system and receiving the response to the remote procedure call.

17. The computer-implemented method of claim 4, wherein receiving the user input to invoke performance of the activity by the computing device comprises identifying that the user input has selected a control associated with the activity in a user interface of a web page or application displayed on an electronic display of the computing device.

18. One or more non-transitory computer-readable media having instructions stored thereon that, when executed by one or more processors, cause performance of operations comprising:
receiving, at a computing device, a user input to invoke performance of an activity by the computing device;
identifying multiple original portions of computer code that perform the activity, wherein each original portion of computer code among the multiple original portions of computer code is scheduled to be executed by the computing device at different times;
for each respective original portion of computer code among the multiple original portions of computer code that perform the activity:
intercepting a scheduled execution of the original portion of computer code;
modifying the original portion of computer code to include (i) pre-work operations that are arranged to be executed before the original portion of computer code is executed, and (ii) post-work operations that are arranged to be executed after the original portion of computer code is executed;
executing the modified portion of computer code, including executing (i) the pre-work operations for the original portion of computer code, (ii) the original portion of computer code, and (iii) the post-work operations for the original portion of computer code after the performance of the pre-work operations and the original portion of the computer code;
recording data about the executing of the modified portion of computer code that indicates a time duration of the executing of the modified portion of computer code, and
determining whether at least one subsequent portion of the computer code is also required to be executed to complete the activity; and
outputting a total time to completion of the activity based at least in part on aggregating the recorded data about the executing of the multiple portions of computer code.

* * * * *

UNITED STATES PATENT AND TRADEMARK OFFICE
CERTIFICATE OF CORRECTION

PATENT NO. : 10,165,071 B2
APPLICATION NO. : 14/997370
DATED : December 25, 2018
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 122 days.

Signed and Sealed this
Sixteenth Day of July, 2019

Andrei Iancu
*Director of the United States Patent and Trademark Office*